Aug. 24, 1965

G. RASMUSSEN 3,201,847

DEVICE FOR HELICAL EDGEWISE WINDING
OF A STRIP ONTO A ROTATING TUBE

Filed July 5, 1961

INVENTOR.
Gustav Rasmussen
ATTORNEY.
Beaman & Beaman

Aug. 24, 1965

G. RASMUSSEN 3,201,847

DEVICE FOR HELICAL EDGEWISE WINDING
OF A STRIP ONTO A ROTATING TUBE

Filed July 5, 1961

INVENTOR
GUSTAV RASMUSSEN
BY Beaman & Beaman
ATTORNEYS

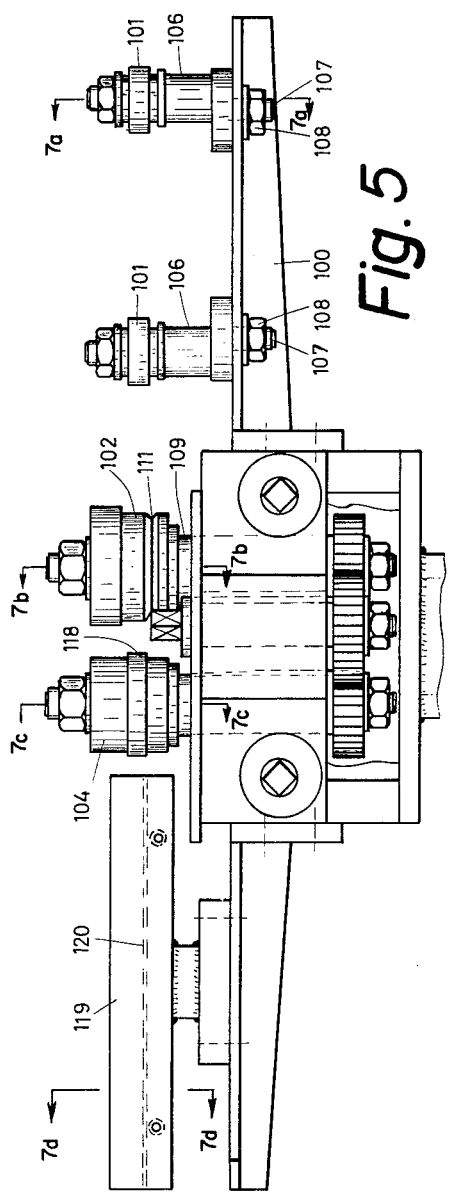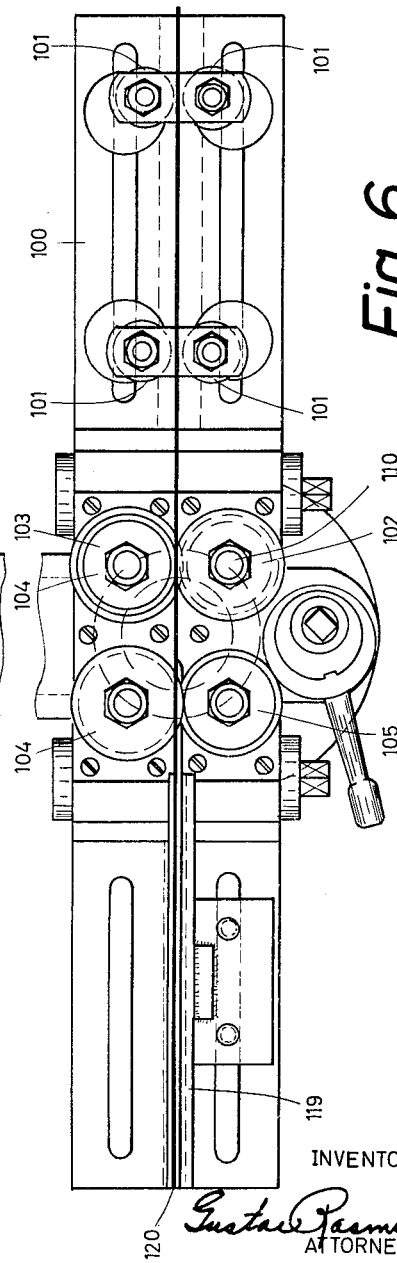

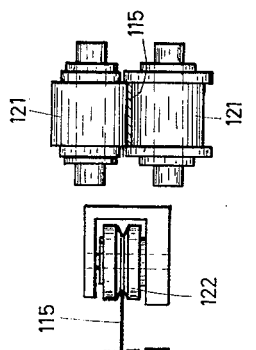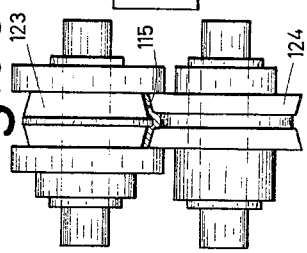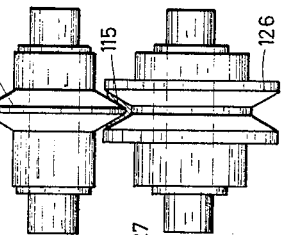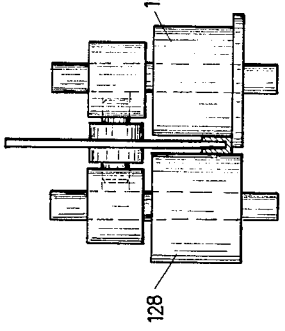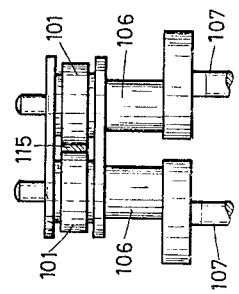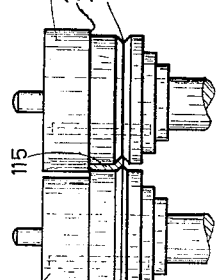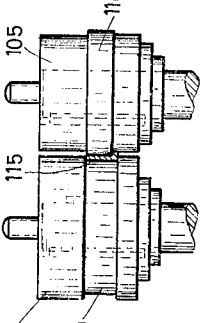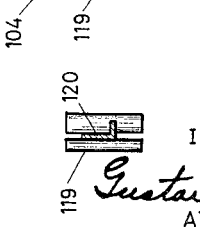

United States Patent Office 3,201,847
Patented Aug. 24, 1965

3,201,847
DEVICE FOR HELICAL EDGEWISE WINDING OF A STRIP ONTO A ROTATING TUBE
Gustav Rasmussen, Stader Strasse 244–256,
Hamburg-Harburg, Germany
Filed July 5, 1961, Ser. No. 131,454
Claims priority, application Germany, July 5, 1960,
R 28,265
2 Claims. (Cl. 29—33)

The invention relates to a device for helically winding the edge of a ribbon, or strip onto a rotating tube which is longitudinally advanced in correspondence with the pitch of the strip to be wound thereon. The strip to be wound on the tube may have a rectangular cross section of a cross section that has been formed into a profile prior to the winding operation, for instance, into an L-shaped or U-shaped profile.

Devices are known wherein a tube clamped at one or both ends, but axially nondisplaceable, is rotated while the strip to be wound thereon is moved along the rotating tube is coaxial relation with a guiding device, and sliding through said guiding device. These known devices have shortcomings in many respects, as tubes with a small diameter will bend between the clamping locations during winding and tubes cannot be wound throughout their entire length. Furthermore, the production lengths of the tubes are relatively closely limited by the prior art devices. In addition, especially in connection with tubes having relatively small diameters, torsional stresses will occur during the winding operation which will produce undesired back stresses and make the production of short tube lengths necessary.

In order to overcome these shortcomings, devices have already been designed, in which the tube is not only rotatably driven but also longitudinally advanced. In this operation, the combined driving and advancing device for the tube may be kept at a relatively short distance from the stationary place of winding.

A known device for effecting the rotational and advancing movement of the tube comprises a drive roller for the tube which is kept in close contact with the tube, wherein the distance between the axis of the tube and the axis of the roller as well as the inclination of the roller with respect to the axis of the tube are variable. This known device employs a generally known means for feeding the strip to be wound onto the tube in which the strip is fed edgewise to the tube through a slot. When winding the strip around the tube, stresses will occur in the strip which become greater the smaller the radial distance from the axis of the tube. The effect of these stresses is that creases are formed in the strip wound onto the tube which have a corrugated shape which is deepest at the point of contact with the tube and decreases radially outwardly.

It is an object of the invention to provide a feeding device for a strip to be wound on a tube in which the formation of creases is substantially eliminated. Furthermore, the feeding device in accordance with the invention is to be designed in such a manner that it is also possible to wind onto the tube, not only flat strips having a rectangular cross section, but also strips which have previously been shaped into an L-shaped or U-shaped cross section. The device for forming the strip into an L- or U-shaped profile is to be driven by the strip itself moving toward the rotating and advancing device, so that the deformation of the strip will occur automatically when the strip is wound onto the tube.

To solve these problems, the invention consists of at least one rotatably supported strip guide roller formed at its periphery with an annular recess which substantially corresponds to the cross section of the strip. The strip is pulled through a preceding feeding, or forming device and is guided and kept close to the tube by the recess, and the strip-guiding roller is capable of being adjusted in the axial direction of the tube as well as in its radial distance from the axis of the tube, and is capable of rotation about an axis transversely disposed with respect to the axis of the tube and intersecting the axis of the tube and the axis of the strip feeding roller in correspondence with the pitch angle of the strip to be wound. The strip feeding roller is also adapted to be locked in its adjusted position.

One advantageous embodiment of the subject of the invention provides that three strip-guiding rollers are arranged on a tool carrier head at an angular spacing of 120°, said tool carrier head being connected with the machine base and likewise carrying feeding and deforming device.

In a device according to the invention it is of advantage to knurl or serrate the peripheral area of the roller to increase the frictional engagement between the roller and the tube. The strip supply, or deforming rollers are driven by the advancing strip when it is wound onto the tube.

In accordance with the invention, the strip forming device cooperating with the feeding device comprises a carrier member rigidly connected with the machine on which there are arranged, in series, at least one pair of guiding rollers, one or several pairs of profiled forming rollers depending on the requirements of the profile to be formed, and a longitudinal guide for the formed strip, wherein the forming rollers are coupled with one another through gears and are driven by the advancing strip, with the roller nips being adjustable.

Further features and advantages of the invention will be seen from the following specification in connection with the drawings and the claims, but the invention is not restricted to the embodiments shown by way of example because modifications are possible without departing from the scope of the invention.

In the drawings,

FIG. 1 is a perspective view of a known device for rotating and advancing the tube onto which a strip is to be wound, FIG. 2 is a perspective view of a device in accordance with the invention for winding a strip onto a tube with no creases, said strip having an L-shaped or U-shaped cross section, the illustrated device preferably being used in cooperation with the tube rotating and advancing device shown in FIG. 1, FIG. 3 is an enlarged detail, elevational view of two of the strip-guiding rollers, the upper roller being shown in diametrical section, FIG. 4 is a perspective view of a device in accord with the invention shown applying a strip to a tube, a portion of the tube drive apparatus cover being cut away to illustrate the tube rotating and advancing apparatus.

FIG. 5 is an elevational view of an embodiment of the stirp forming device,

FIG. 6 is a plan view of the strip forming device of FIG. 5,

FIGS. 7a through 7d are diametrical views of the series-arranged roller pairs for forming an L-shaped strip profile and the longitudinal guide taken along lines 7a—7a through 7d—7d, respectively, of FIG. 5, the rollers and guide being shown in full lines for purposes of illustration, FIG. 8 is an elevational view similar to that of FIG. 5, but of another embodiment of the strip forming device in which a U-shaped profile is formed, and FIGS. 9a through 9e are diametrical views of the roller pairs for forming a U-shaped strip profile taken along lines 15a—15a through 15e—15e, respectively, of FIG. 8, the rollers being shown in full lines for purpose of illustration.

Initially, the device shown in FIGS. 1 through 4 is to be described.

Figure 1:
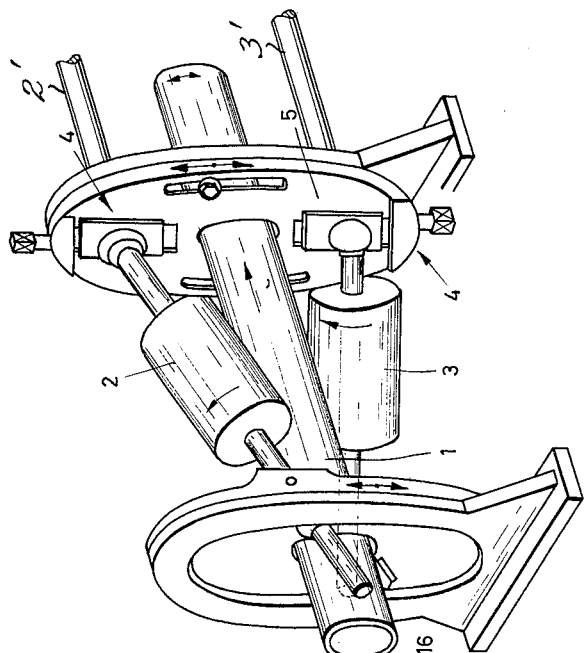

The device shown in FIG. 1 for rotating and advancing is known and consists of two driven rollers 2 and 3, rotated by driven shafts 2' and 3', which are adjustable with respect to the radial distance from the axis of the tube and by means of the carriage guide 4 and with respect to the inclination of the roller axis relative to the axis of the tube by means of the adjusting member 5 which is pivatable about the axis of the tube. This device is shown in my United States Patent 2,753,040.

Figure 2:
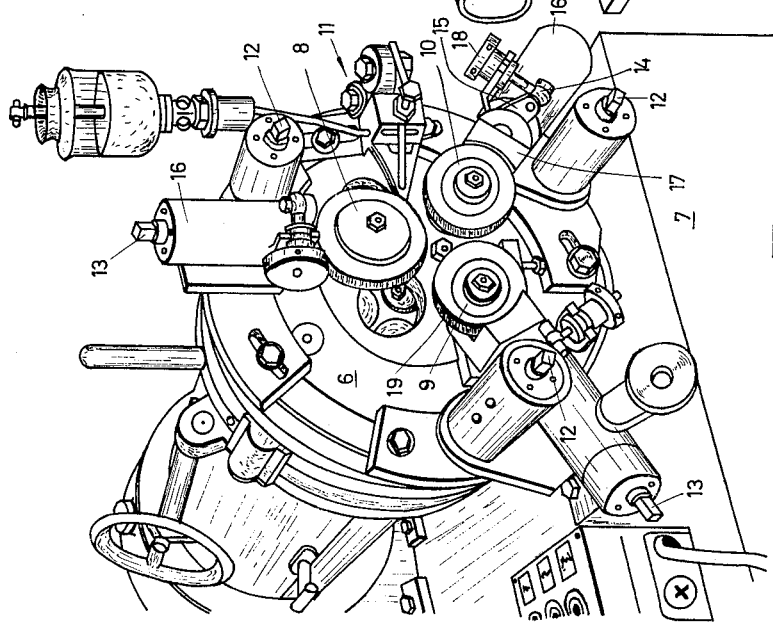
Figure 3:
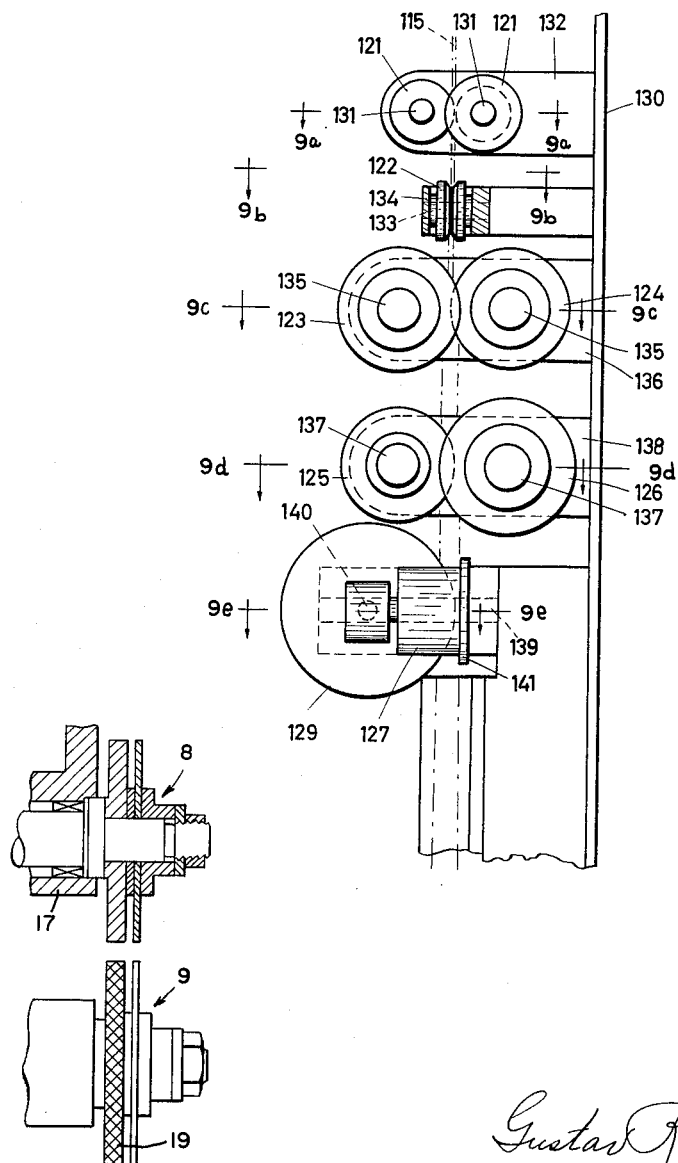
Figure 4:
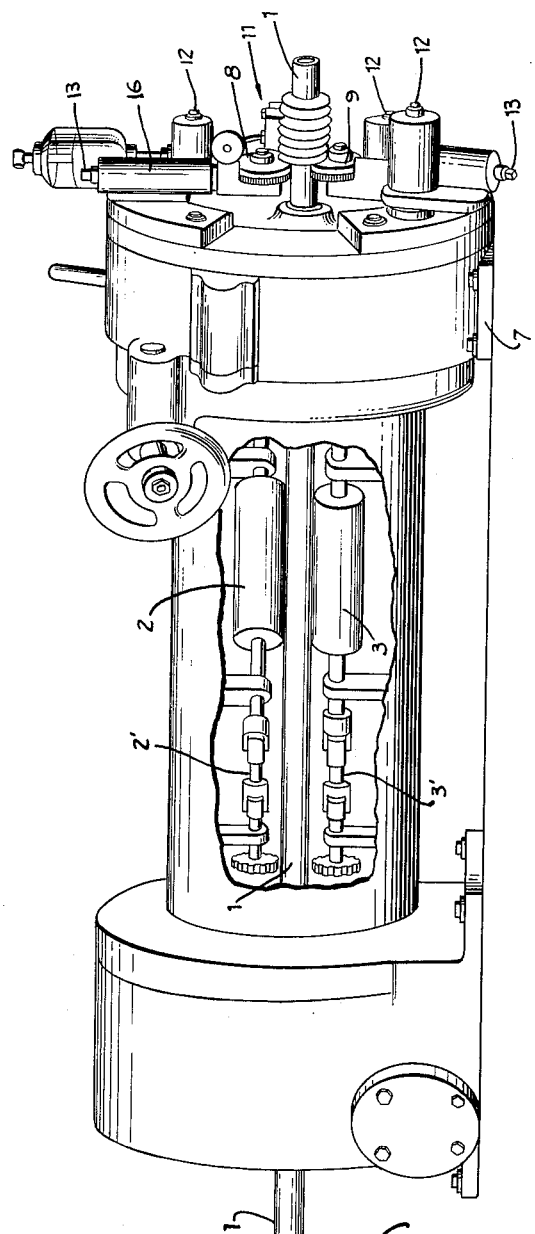

The device shown in FIG. 2 is arranged behind the driving device according to FIG. 1 with respect to the direction of the advance of the tube 1, as will be apparent in FIG. 4, and comprises a tool carrier head 6 rigidly connected with the machine frame 7. On the tool carrier head 6, three strip-guiding rollers 8, 9 and 10 are mounted angularly spaced at 120°, wherein the strip is fed to the first strip-guiding roller from a known guiding device 11 for strips having a rectangular cross section. The strip being wound on the tube 1, while the tube is rotating, is engaged by the guiding rollers 9 and 10 in an annular slot provided on the periphery in the same manner as is the case with the guiding roller 8, in which an exact alignment of the pitch and a further smoothing is effected. Actually, a single guiding roller would suffice. However, by employing three guiding rollers neater work is guaranteed. It is pointed out that a strip forming device according to FIGS. 5 through 9e may be employed instead of the known guiding device 11, in which case the annular recess in the periphery of the guiding rollers will then be adapted to the respective strip profile.

The guiding rollers 8, 9 and 10 are adapted to be adjusted independentlly of one another in an axial direction with respect to the tube by means of the threaded spindles 12, in a radial direction with respect to the tube axis by means of the threaded spindles 13, and about an axial plane in order to adjust the inclination of the rollers with respect to the axis of the tube corresponding to the pitch angle of the helically wound strip by means of the eyelet screws 14 which pivotally engage the arm 15, as shown, for one of the holders 17 projecting outwardly from a shank of a roller holder 17 supported in a housing 16 on which roller 10 is freely rotatably supported. The eyelet screws 14 are threaded into nuts 18 which are rotatable but axially nondisplaceably supported at the housing 16, so that upon turning the nuts 18 a rotative movement of the roller holder 17 about the radially extending axis of the shank is effected.

The guiding rollers 8, 9 and 10 must, of course, be displaced in an axial direction of the tube axis in correspondence with the pitch of the strip to be wound on the tube which, as already mentioned, is effected by the spindles 12. It is to be noticed that, owing to the angular spacing of 120°, the third roller 10 must be axially displaced from the first roller 8 twice the distance of roller 9 in the advancing direction of the tube. The rollers 8, 9 and 10 are rotated by frictional contact with the tube 1, wherein the outer periphery of the rollers 8, 9 and 10 is suitably provided with a knurling, serration, or the like, in order to increase the frictional engagement of the rollers.

In the following, the strip forming device shown in FIGS. 5 through 9e will be described which may be arranged in the feed path of the strip leading to the strip roller 8 in a transverse direction to the tube axis to produce an L-shaped or U-shaped cross section of the strip. The feeding device 11, shown in FIG. 2, serves to wind a flat strip on the tube.

The forming device shown in FIGS. 5 through 7d, which may be used instead of the feeding device 11, serves to produce an L-shaped profile, i.e., and angular profile having unequal legs, the shorter one of which engages the peripheral surface of the tube when being wound onto the tube 1. The device comprises an elongated carrier member 100 which is rigidly connected with the machine frame or other support fixed relative to the frame. In the feeding direction of the strip, two pairs of rollers 101 are mounted upon the carrier member 100 in spaced relation. The rollers of said pair 101 are formed as cylinders, FIG. 7a, and serve to straighten and feed the strip to the series-arranged profile rollers 102, 103, and 104, 105. The rollers 101 are supported to rotate freely on upwardly extending studs 106. An eccentrically arranged pin 107 projects in an axial direction away from each stud 106, and is rotatably supported in the carrier member 100 to thereby allow adjustment of the nip of the rollers 101 by rotating the studs 106 about the eccentrics 107. Nuts 108 are screwed onto the eccentrics serving to clamp the studs 106 in their adjusted position.

The following formed roller pair 102, 103 (FIGS. 6 and 7b) is supported to rotate freely on studs 109, 110 rotatably mounted on the carrier member 100. The one roller 102 is provided with an annular groove 111 which has a V-shaped cross section into which the other roller 103 projects with a correspondingly shaped annular rib 112. The roller 102 includes a radially extending shoulder 113 which overlaps a shoulder 114 of the roller 103, thus forming a lateral guide for the strip 115. The annular groove 111 and the annular rib 112 are arranged at such a distance from the shoulder 113 of the roller 102 that the strip passing through the rollers is bent toward one side under an angle of 45°.

The following pair of rollers 104 and 105 serve to finish the L-shaped strip profile. The one roller 105 is provided with a cylindrical rib 118 forming annular shoulders disposed in radial planes, the width between the shoulders corresponding to the length of the strip long leg less the thickness of the strip 115, while the other roller 104 is provided with an annular groove 119 forming annular shoulders disposed in radial planes, the width between them corresponding to the length of the strip long leg. The strip passing through the nip of the rollers 104, 105 is, therefore, formed into an L-shape. The nip between both the roller pairs 102, 103 and 104, 105 is adjustable.

Behind the roller pair 104, 105, a guide 119' is fastened to the carrier member 100 and is provided with a slot 120 corresponding to the L-shaped profile through which the deformed strip is fed to the first strip-guiding roller 8.

The roller pairs are rotated by the advancing strip while the strip is being wound onto the tube.

The forming device shown in FIGS. 8 and 9a through 9e is very similar to that shown in FIGS. 5 through 7d except that the pairs of rollers are formed and arranged in such a manner that the strip 115 is deformed to a profile of U-shaped cross section. The embodiment of FIGS. 8 and 9a through 9e includes an elongated carrier member 130 mounted rigidly on the machine frame 7, or tool head 6 (FIG. 2), instead of the illustrated feeding device 11. A first pair of rollers 121 in the advance direction of the strip, which corresponds to rollers 101 in the embodiment of FIGS. 5 through 7d is arranged horizontally, one roller above the other, and journaled to rotate freely about pins 131 mounted in upright members 132 rigidly fixed to the carrier member 130. The rollers 121 are shaped cylindrically and serve to straighten and guide the flat strip 115. A second pair of rollers 122 rotates about vertically disposed pins 133 mounted in U-shaped brackets 134 rigidly fixed to carrier member 130. This pair of rollers 122 engages the opposed edges of the strip 115 by means of peripheral grooves so as to guide the strip 115 laterally. A third pair of rollers 123, 124 is arranged horizontally, one roller above the other, and these rollers rotate around pins 135 mounted in upright members 136 rigidly fixed to the carrier member 130. The peripheries of these rollers are profiled so as to deform the flat strip to an obtuse-angled V-shaped profile, as shown in FIG. 7c. A fourth pair of rollers 125, 126 is arranged horizontally, one roller above the other, and rotates around pins 137 mounted in upright members 138 rigidly fixed to the carrier member 130. The peripheries of rollers 125 and 126 are likewise profiled so as to deform the obtuse-angled V-shape of the strip 115 into an acute-angled V-shape form. A fifth pair of rollers 127, 128 is employed having cylindrical surfaces. The rollers 127 and 128 are rotatably journaled on vertically disposed pins 139 mounted on the carrier member 130. A disc 129 is rotatably supported on a pin 140 extending horizontally between the pins 139. The disc 129 extends between the nip of the rollers 127, 128 so that the legs of the V-shaped strip will be pressed against both sides of the disc 129. One of the rollers 127 has a radially outwardly extending flange 141 bearing against the web of the U-shaped profile in order to maintain the strip in its proper position between the rollers 127, 128. The strip leaving the nip of the pair of rollers 127, 128 is finished. A guide corresponding to the guide shown in FIGS. 5 through 7d, but adapted to the U-shaped cross section of the strip, guides the strip to the first guide roller 8 to be wound on the tube 1. All the rollers are mounted for free rotation and are rotated by the advancing strip passing therethrough.

The invention provides a device for the production of finned tubes which is capable of winding not only flat strips substantially free of creases but also U-shaped and L-shaped strips onto a tube. The latter is of essential importance as a larger area of heat transmission is provided from the tube to the rib.

It will of course be understood that various changes in details of construction and arrangement of parts may be made by those skilled in the art without departing from the spirit of the invention as set forth in the appended claims.

What I claim is:

1. Apparatus for helically winding a strip upon a tube comprising, in combination, a frame, a tool carrier head fixed on said frame having a longitudinal axis and a central opening defined therein through which said axis extends, drive means adapted to simultaneously rotate and axially translate a tube through said tool carrier head opening concentric to said longitudinal axis, said tool carrier being in fixed relationship to said drive means, at least one strip-guiding roller rotatably mounted upon said tool carrier head in the region of winding the strip upon the tube, annular strip guide means defined in the periphery of said roller, a tube-engaging surface defined on said roller for frictional engagement with the tube, said annular strip guide means being shaped to wholly enclose in cross section said strip to said tube-engaging surface for guiding said strip and keeping it in contacting engagement on said tube so that the formation of creases is substantially eliminated, first means mounting said roller upon said head for movement in a direction parallel to said longitudinal axis, second means mounting said roller upon said head for movement in a direction radially with respect to said longitudinal axis, and third means mounting said roller upon said head for pivoted movement about an axis substantially perpendicularly disposed to said longitudinal axis and the axis of rotation of said roller.

2. Apparatus for helically winding a strip upon a tube comprising, in combination, a frame, a tool carrier head mounted on said frame having a longitudinal axis and a central opening defined therein through which said axis extends, drive means adapted to simultaneously rotate and axially translate a tube through said tool carrier head opening concentric to said longitudinal axis, three strip-guiding rollers mounted upon said tool carrier head, said rollers being angularly spaced about said longitudinal axis at 120° intervals, annular strip guide means defined in the periphery of each of said rollers, a tube-engaging surface defined on said rollers for frictional engagement with the tube, first means mounting each of said rollers upon said head for movement in a direction parallel to said longitudinal axis, second means mounting each of said rollers upon said head for movement in a direction radially with respect to said longitudinal axis, and third means mounting each of said rollers upon said head for pivotal movement about an axis substantially perpendicularly disposed to said longitudinal axis and the axis of rotation of said rollers.

References Cited by the Examiner

UNITED STATES PATENTS

| | | | |
|---|---|---|---|
| 396,908 | 1/89 | Wiseman | 287—87 X |
| 857,284 | 6/07 | Huber | 82—61 |
| 1,289,257 | 12/18 | Pierce | 80—13 X |
| 1,610,860 | 12/26 | Kellogg | 153—2 |
| 1,695,363 | 12/28 | Causey et al. | 82—61 |
| 1,764,775 | 6/30 | Bommer | 82—2.5 X |
| 1,896,350 | 2/33 | Bundy | 29—33 X |
| 1,921,975 | 8/33 | Jones | 29—33 |
| 2,004,388 | 6/35 | Dewald | 29—33 |
| 2,152,437 | 3/39 | Lear | 29—33 X |
| 2,416,865 | 3/47 | Bronander | 153—64.5 X |
| 2,604,138 | 7/52 | Harrison. | |
| 2,661,525 | 12/53 | Edwards | 29—33 X |
| 2,753,040 | 7/56 | Kasmussen | 153—64.5 X |
| 2,847,055 | 8/58 | Matheny | 153—64.5 |
| 2,860,706 | 11/58 | Marsden | 82—102 X |
| 2,905,243 | 9/59 | Rodder | 82—61 |
| 2,945,296 | 7/60 | Jones. | |
| 3,052,392 | 9/62 | Vogt | 82—26 X |

FOREIGN PATENTS 403,734  1/34  Great Britain.

OTHER REFERENCES

Mechanical Engineer's Handbook, ed. by Marks, 5th ed., New York, McGraw-Hill Book Co., 1951, pp. 1405, 1408.

RICHARD H. EANES, JR., *Primary Examiner.*

WHITMORE T. WILTZ, *Examiner.*